No. 610,224. Patented Sept. 6, 1898.
E. I. BRADDOCK,
COMPOSITE PIPE.
(Application filed Jan. 3, 1898.)
(No Model.)
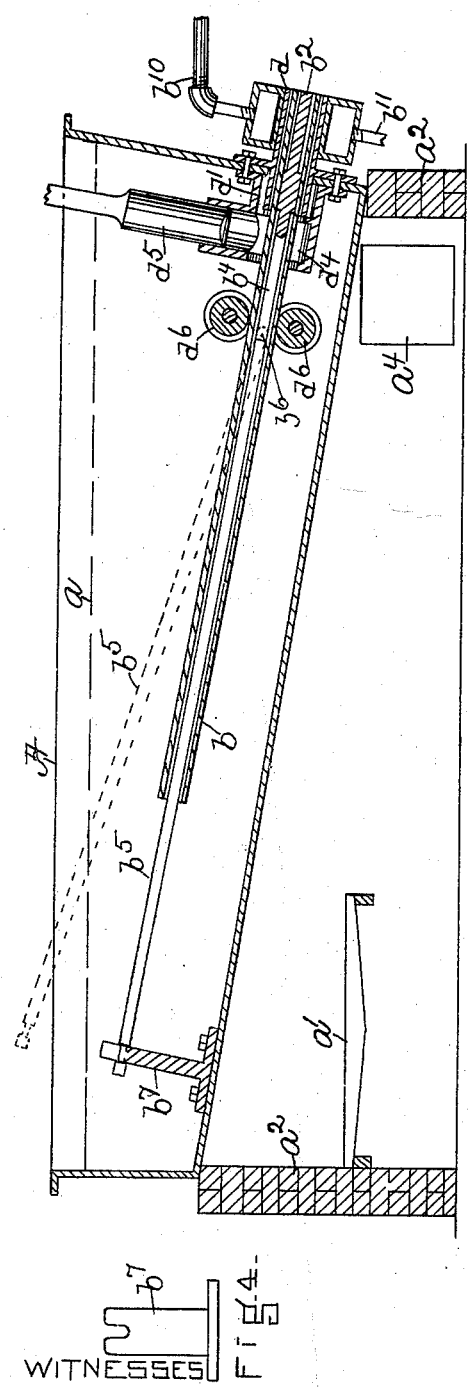
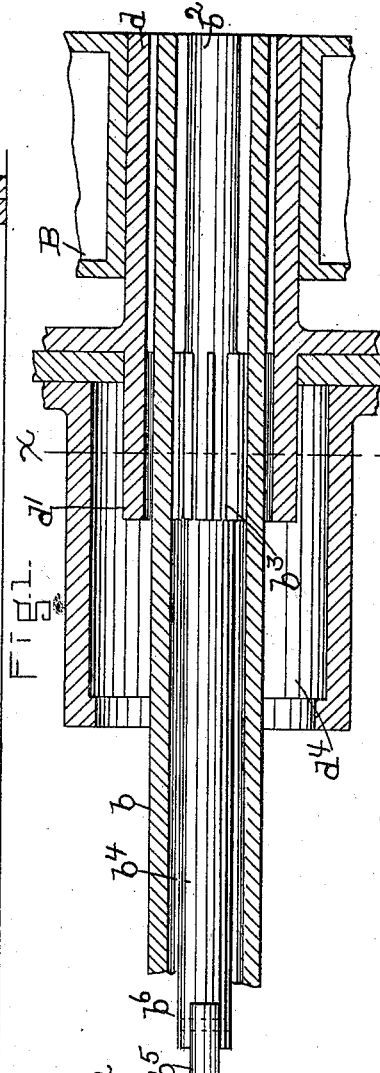
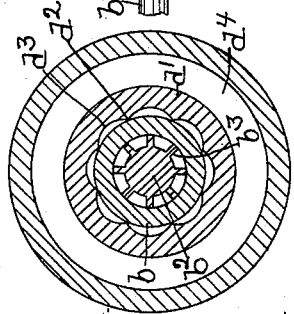
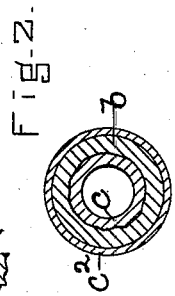
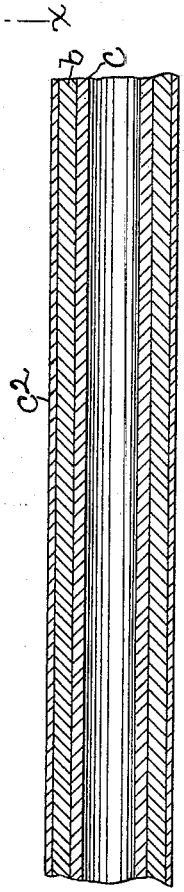
WITNESSES
Matthew M. Blunt
J. Murphy.
INVENTOR
Edward I. Braddock
by Jas. H. Churchill
ATTY.

UNITED STATES PATENT OFFICE.

EDWARD I. BRADDOCK, OF MEDFORD, MASSACHUSETTS.

COMPOSITE PIPE.

SPECIFICATION forming part of Letters Patent No. 610,224, dated September 6, 1898.

Application filed January 3, 1898. Serial No. 665,384. (No model.)

*To all whom it may concern:*

Be it known that I, EDWARD I. BRADDOCK, residing in Medford, in the county of Middlesex and State of Massachusetts, have invented an Improvement in Composite Pipes, of which the following description, in connection with the accompanying drawings, is a specification, like letters on the drawings representing like parts.

This invention relates to a composite non-corrodible metal pipe, and has for its object to provide a composite non-corrodible pipe which is stronger, cheaper, and more efficient than non-corrodible pipes now commonly produced and known to me.

In accordance with this invention the composite pipe is made up of two or more concentric tubes, one of which is composed of comparatively inexpensive and strong although easily-corrodible metal having a relatively high melting-point, such as iron or steel, and which will be hereinafter referred to as the "primary" tube, and the secondary or protecting tube or tubes are of metal having a relatively low melting-point, such as lead, tin, zinc, or their alloys, commonly known in the arts as "non-corrodible" metals.

The composite pipe may and preferably will be produced by chemically cleansing the primary tube by pickling in the usual manner, treating the same with a liquid flux, such as chlorid of zinc, placing the primary tube upon a mandrel, and then immersing it in a tank of molten non-corrodible metal such as specified, after which the primary tube is fed forward through a chilling-die at the end of the tank, wherein a composite pipe is formed with a tubular covering of the non-corrodible metal, progressively built upon one or both surfaces of the primary tube as fast as that tube advances into the chilling portion of the die.

Iron or steel tubes which have been previously chemically cleansed, fluxed, and tinned or galvanized may be employed without further cleansing or fluxing, and a composite pipe may be produced therefrom by applying and uniting the non-corrodible metal thereto, as above described.

The union between the primary and secondary tubes is a molecular union similar to that effected by such an operation as tinning, galvanizing, brazing, or soldering; but this invention is to be distinguished from the product of those processes from the fact that by neither of them can a secondary tube of metal of any substantial thickness be formed upon and united with either surface of a primary tube.

Hereinafter for the sake of brevity the word "iron" only will be used when naming the metal for the primary or corrodible tube and the word "tin" when naming the metal for the secondary or non-corrodible tube.

An apparatus by the aid of which composite non-corrodible pipes may be successfully produced is illustrated in the drawings, wherein—

Figure 1 is a longitudinal sectional elevation of the apparatus. Fig. 2 is a horizontal section through the forming-die, with the primary tube of metal containing the mandrel inserted in said die. Fig. 3 is a section on line $x\,x$ in Fig. 2. Fig. 4 is a front view of the device within the tank for engaging the rod which holds the mandrel in a stationary position. Fig. 5 is a longitudinal section of the improved composite pipe, and Fig. 6 is a cross-section of such pipe.

Referring to Fig. 1 of the drawings, A is a metal tank or vessel for holding the metal from which the secondary or protecting tubes are to be formed, and in which that metal is maintained in a molten condition by a furnace, indicated by a grate $a'$. The tank is supported upon suitable walls $a^2\,a^2$, the products of combustion from the furnace having an outlet to the chimney at $a^4$. Preferably the tank is constructed with an inclined bottom, as shown, so that the primary tubes to be covered may be readily introduced into the forming-die, which has a similar inclination and is attached at one end of the tank, and thus the molten metal may flow by gravity through such die and also through the interior of the tube which is under operation when it is immersed in the bath of metal. The broken line $a$ may represent the level of the molten metal. $b$ is the iron tube to be covered; $b^2$, the mandrel around which the interior secondary tube $c$ is formed within the primary tube $b$. Upon the inner end of this mandrel longitudinal ribs or wings $b^3$ are formed or attached to serve as centering devices for the forming portion $b^2$ of the mandrel. The height of the projecting centering-ribs upon the mandrel and the size of the mandrel itself are determined by the size of the bore of the primary tube and the size of the bore desired for the composite pipe. $b^4$ is an extension of the mandrel, to which a rod $b^5$ is hinged at $b^6$. This rod is provided with a shoulder upon its outer end to engage a standard $b^7$, secured within the tank to prevent the rod, and with it the mandrel, from being carried out of the tank with the tube $b$ when it is fed forward.

$d$ is the cylindrical die in which the exterior secondary tube $c^2$ of the composite pipe is formed. $d'$ may be a portion of the same cylindrical tube as the die $d$, but extending into the tank A, and it has formed upon its inner surface or connected therewith ribs $d^2$, which serve to center the tube $b$ within the die $d$. An alternative construction is to make the interior diameter of the portion $d'$ the same as the external diameter of the tube $b$ and then form one or more longitudinal grooves $d^3$, Fig. 3, along the interior of that portion to permit the flow of molten metal into the die $d$. Around the outer end of the die $d$ is a chilling-jacket B, provided with an inlet-pipe $b^{10}$ and an outlet-pipe $b^{11}$. Within the tank A and attached to the wall thereof immediately back of the outlet into the forming-die is a valve-chamber $d^4$, through which the tube $b$ passes when inserted into the die, and when the tube $b$, with its mandrel, is removed from the forming-die the outlet-passage is closed by means of a plunger-valve $d^5$, which is pushed down into the valve-chamber $d^4$ across the passage leading to the forming-die.

$d^6$ $d^6$ are two grooved rolls which guide the tube $b$ and move it forward through the tank and forming-die. The length of the ribs $b^3$ upon the mandrel $b^2$ should be sufficient to give a stable bearing upon the interior of the tube $b$ and hold the mandrel proper, which is to determine the interior bore of the composite pipe, in an accurately central position within the tube $b$, and also the length of the portion $d'$ should be sufficient to give a stable bearing to the tube $b$ and hold it in an accurately central position in the die $d$.

In Figs. 5 and 6, which represent the completed composite pipe, $b$ is the primary tube of iron, $c$ the interior secondary tube of tin or similar metal, and $c^2$ the exterior secondary tube. The thickness of these two secondary tubes may be regulated as desired by varying the size of the mandrel $b^2$ in relation to the bore of the tube $b$ and the size of the interior diameter of the die $d$ with relation to the exterior diameter of the said tube $b$.

When it is desired to unite a secondary non-corrodible tube to the interior only of the tube $b$ the grooves $d^3$ in the portion $d'$ are omitted, and thus leave a closely-fitting cylindrical collar around the exterior of the tube $b$, which will prevent the flow of metal along the outside of it.

The operation of forming a composite pipe in this apparatus according to the method above described is as follows: Having filled the tank A with molten tin or similar non-corrodible metal up to a level, for instance, as indicated by the broken line $a$, a section of iron tube $b$ is slipped over the mandrel and its retaining-rod $b^5$. The end of the tube in which the mandrel is located is inserted into the bath of molten metal, pushed between the rolls $d^6$, and thence against the valve $d^5$. That valve is then raised and the tube $b$, with the mandrel, is moved forward through the centering portion $d'$ out into the die $d$. As soon as the valve $d^5$ is raised the molten metal will flow out into the die $d$; but before it can flow out from the end of that die the chilling-jacket B will have congealed and solidified it, thus forming a solid plug of metal, which will prevent the escape of any portion of the metal in the molten state. Then as the tube $b$ is caused to pass along over the mandrel and through the forming-die this plug of metal will be pushed out and the molten metal in the tank will flow forward through the grooves $d^3$ in the portion $d'$ and between the ribs $b^3$ on the inner end of the mandrel. Immediately after passing beyond these grooves into the inner part of the die $d$ and around the mandrel $b^2$ the molten metal will begin to be cooled by the chilling-jacket around the outer end of the forming-die, and before it has passed far within the portion of that die which is surrounded by the chilling-jacket this non-corrodible metal will be congealed and solidified around the exterior and upon the interior of the tube $b$ and securely united therewith.

As the movement of the tube $b$ is continued through the die $d$ the molten metal will continue to flow through the said grooves into the forming-die and around the mandrel and will be progressively solidified around and within the tube $b$ at the part near the end of said die and mandrel, this solidified portion being always followed by and immediately joined to other portions of such metal in a molten condition. The chilling of the metal in this manner to form the secondary tubes tends to cause the metal of both the inner and outer secondary tubes to shrink toward the fluxed primary tube $b$ and thus separate this metal from the interior of the die and the exterior of the mandrel sufficiently to permit the completed composite pipe to be readily pushed out of the die and off from the mandrel. As soon as one length of pipe has been fed through the die, so that its rear end has passed the hinge $b^6$, the rod rod $b^5$ is raised from the tank to the position indicated by dotted lines, Fig. 1, another length of pipe slipped over the rod, entered between the feeding-rolls $d^6$, and the rod $b^5$, with the tube thereon, dropped back to the position shown in full lines in Fig. 1 and the pipe-forming process continued, and in this way the manufacture is substantially continuous as long as desired, a fresh supply of tin or other similar metal being supplied to the tank as it is consumed in the formation of the non-corrodible covering for the iron tube.

From the above description it will be seen that a composite non-corrodible pipe may be formed of a corrodible iron or steel tube $b$ and a non-corrodible tube $c$ within the tube $b$ and joined thereto by a molecular union of the metals of said tubes, so that when the composite pipe is subjected to the uses to which non-corrodible pipes made wholly of lead, zinc, tin, or their alloys are put the tube $c$ does not expand and contract independent of the iron tube $b$, and consequently does not crack and break or become brittle, but remains for an indefinite time in its original condition, firmly and molecularly united to the iron tube and completely protecting the same against corrosion. The same is also true of the tube $c^2$ on the outside of the tube $b$. The composite non-corrodible pipe herein described is stronger, cheaper, and more efficient than pipes of the same size made wholly of non-corrodible metal.

It is to be particularly noted that the product of the method and appliances, both above described, is to be distinguished from an iron or steel tube coated with a film of non-corrodible metal by dipping or galvanizing the iron or steel tube in that the inner non-corrodible tube of the said product is distinctively a tube of substantial thickness, such as could be recognized and used as a tube or pipe were the iron or steel tube absent.

I claim—

1. A composite pipe, consisting of two axially-concentric tubes of metal molecularly united together, the outer one of iron or steel, and the inner one of non-corrodible metal of relatively lower melting-point, such as tin, zinc, lead or their alloys.

2. A composite pipe, consisting of an iron or steel tube inclosed between and molecularly united to two axially-concentric tubes of non-corrodible metal of relatively lower melting-point, such as tin, zinc, lead or their alloys.

3. A composite pipe, consisting of an iron or steel tube, a tube of non-corrodible metal such as specified within said iron or steel tube and molecularly united thereto, and a second tube of non-corrodible metal as specified on the outside of the iron or steel tube, and molecularly united thereto and of less thickness than the non-corrodible tube within said iron or steel tube.

In testimony whereof I have signed my name to this specification in the presence of two subscribing witnesses.

EDWARD I. BRADDOCK.

Witnesses:
JAS. H. CHURCHILL,
J. MURPHY.